United States Patent [19]

Sporn

[11] Patent Number: 5,485,810

[45] Date of Patent: * Jan. 23, 1996

[54] LEASH-CONTROLLABLE DOG HARNESS HAVING PROTECTIVE SLEEVES

[76] Inventor: Joseph S. Sporn, 274 W. 86th St. #4B, New York, N.Y. 10024

[ * ] Notice: The portion of the term of this patent subsequent to Nov. 1, 2011, has been disclaimed.

[21] Appl. No.: 222,034

[22] Filed: Apr. 4, 1994

Related U.S. Application Data

[63] Continuation of Ser. No. 194,720, Feb. 10, 1994, Pat. No. 5,359,964, which is a continuation-in-part of Ser. No. 23,638, Feb. 26, 1993, Pat. No. 5,329,885.

[51] Int. Cl.$^6$ ..................................................... A01K 27/00
[52] U.S. Cl. ............................................ 119/792; 119/907
[58] Field of Search ..................................... 119/792, 793, 119/864, 865, 858, 907, 905, 863; 54/65, 79.3, 23; 224/264, 184

[56] References Cited

U.S. PATENT DOCUMENTS

| | | | |
|---|---|---|---|
| 2,956,541 | 10/1960 | Rall | 119/907 |
| 2,998,008 | 8/1961 | Klesa | 119/858 |
| 3,435,867 | 4/1969 | Hyden | 224/264 |
| 4,570,424 | 2/1986 | Simpson | 54/23 |
| 4,964,369 | 10/1990 | Sporn | 119/907 |
| 5,125,219 | 6/1992 | Sligo | 54/23 |
| 5,134,836 | 8/1992 | Harty | 54/23 |
| 5,172,428 | 12/1992 | Leinoff | 224/264 |

FOREIGN PATENT DOCUMENTS 24675  4/1931  Australia ............................... 119/792

*Primary Examiner*—Todd E. Manahan
*Attorney, Agent, or Firm*—Michael Ebert

[57] ABSTRACT

A leash-controllable dog harness is adapted to inhibit a dog from straining against a leash held by an individual walking the dog, the harness inducing the dog to come to a halt or to walk at a pace acceptable to the leash holder. The harness is composed of a pair of loops and a shoulder junction having left and right openings, each loop being formed by a strap of adjustable length whose leading end is linked to the junction and whose trailing end slides through a respective opening and is coupled to the leash whereby when the leash is strained, both straps are then pulled. The loops are angled with respect to each other to interconnect at a crossover site. When the harness is installed on a dog the shoulder junction then overlies the dog's shoulder intermediate the right and left forelegs, and the crossover site lies under the dog's chest, one strap running from the site through the right foreleg crotch, the other strap running from the site through the left foreleg crotch. Should the harnessed dog strain against the leash, this causes both straps to ride up the respective crotches to impose pressure on the highly-sensitive foreleg pits, whereby the dog in order to relieve the resultant discomfort, then relaxes the strain.

6 Claims, 2 Drawing Sheets

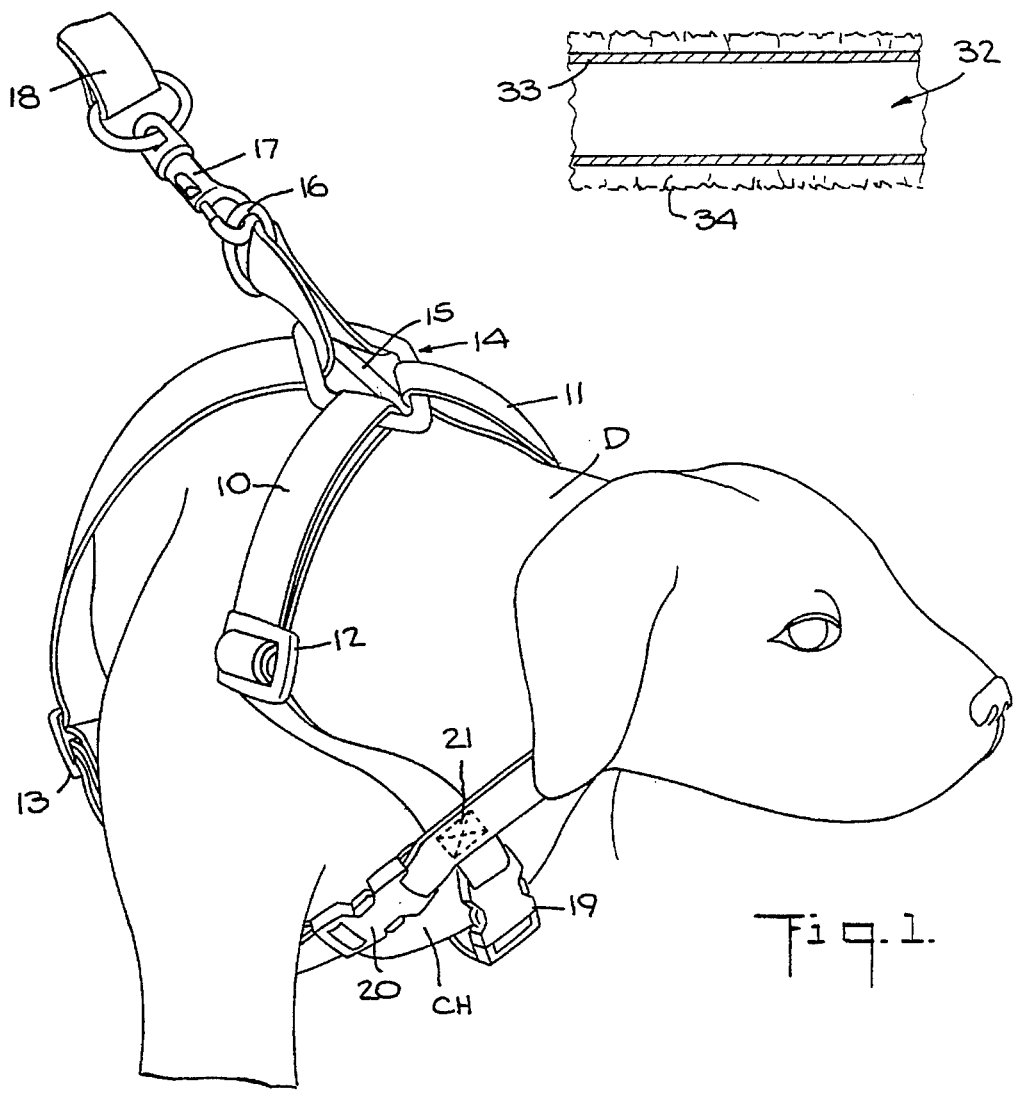
Fig. 7.
Fig. 1.
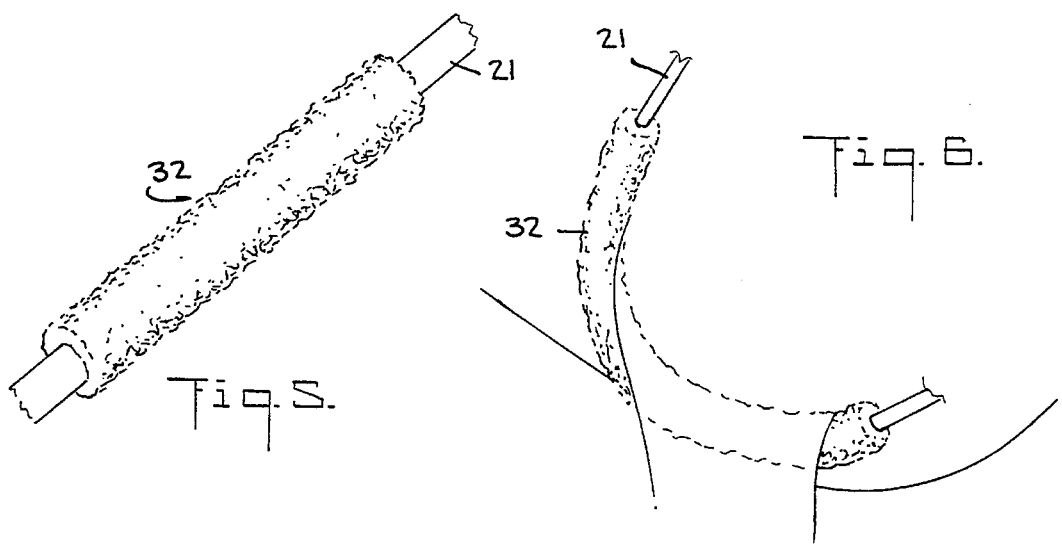
Fig. 5.
Fig. 6.

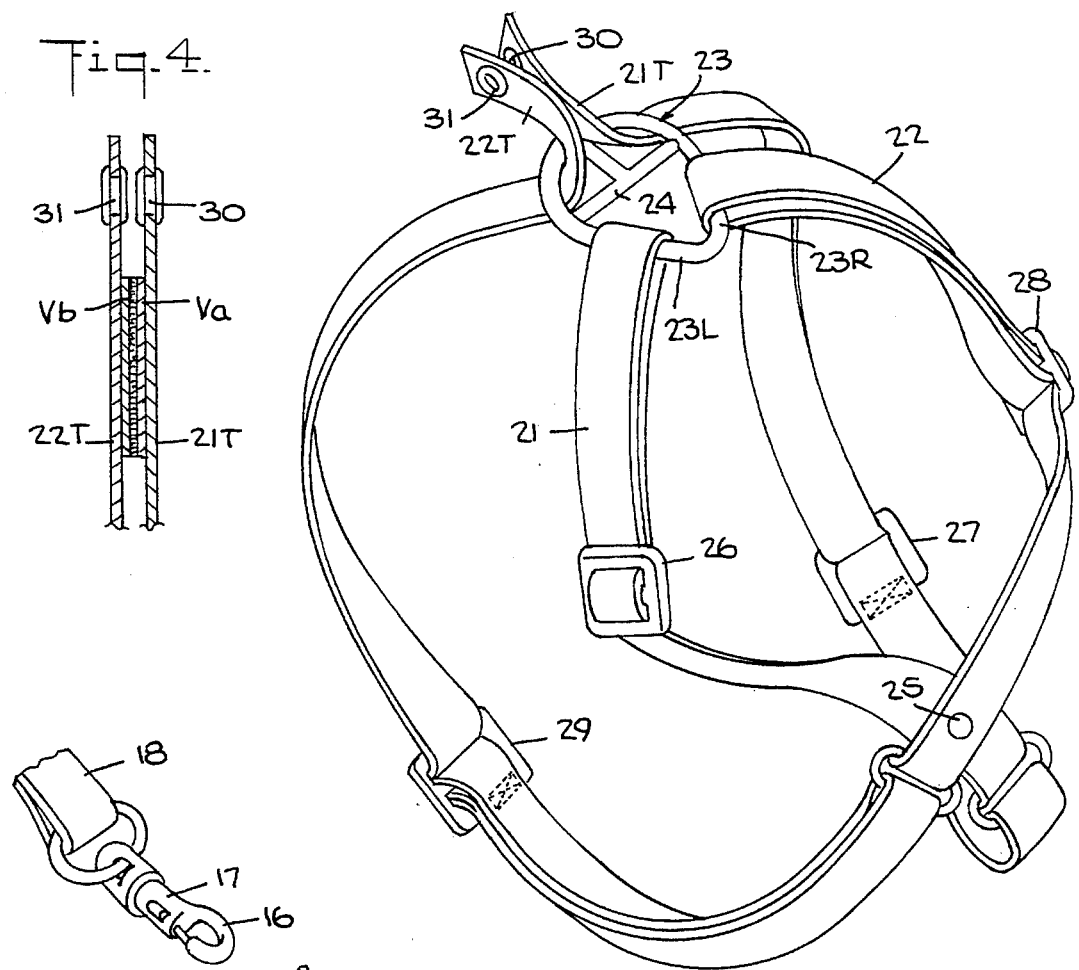
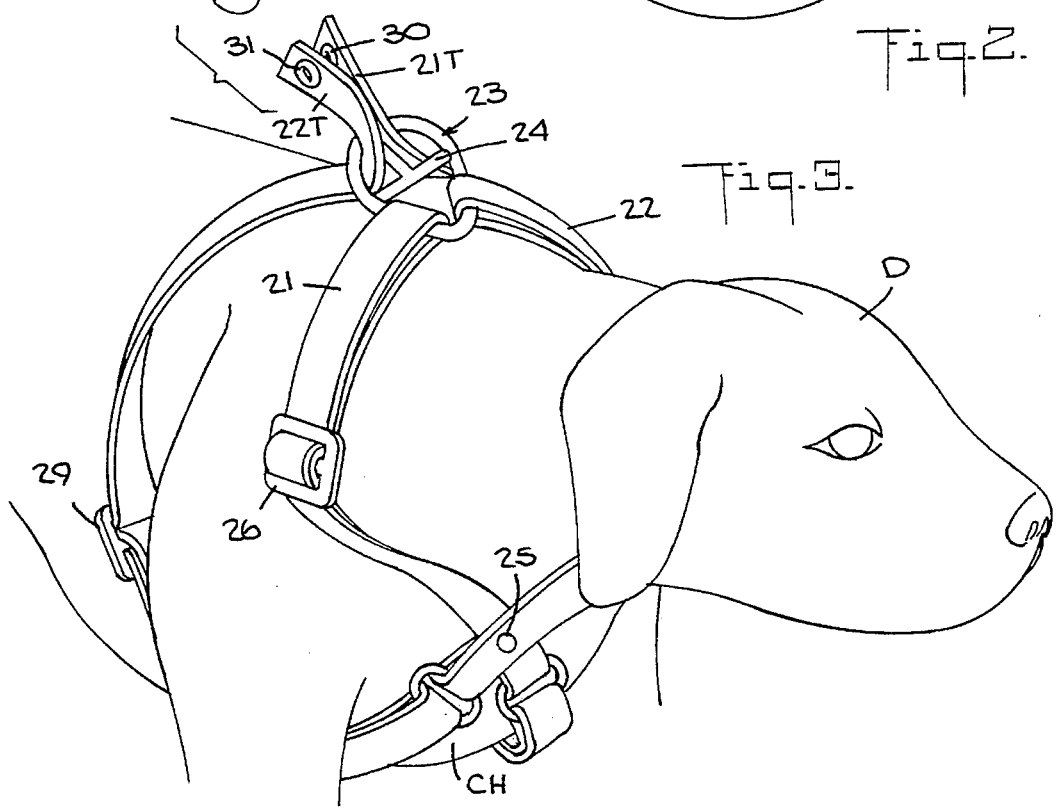

LEASH-CONTROLLABLE DOG HARNESS HAVING PROTECTIVE SLEEVES

RELATED APPLICATIONS

This application is a continuation of my application Ser. No. 08/194,720, filed Feb. 10, 1994, entitled " LEASH-CONTROLLABLE DOG HARNESS" (now U.S. Pat. No. 5,359,964, granted Nov. 1, 1994) which in turn is a continuation-in-part of the application Ser. No. 08/023,638, filed Feb. 26, 1993, entitled "LEASH-CONTROLLABLE DOG HARNESS"(now U.S. Pat. No. 5,329,885, granted Jul. 19, 1994.

BACKGROUND OF INVENTION

1. Field of Invention

This invention relates generally to a dog harness which is connected to a leash held by an individual walking the dog, and more particularly to a leash-controllable dog harness adapted to inhibit the dog from straining against the leash and inducing the dog to come to a halt or to walk at a pace acceptable to the leash holder.

2. Status of Prior Art

A leash is a chain or strap attached to the collar or harness of a dog, the leash being used to lead the dog or to hold it in check.

As pointed out in the Bloom U.S. Pat. No. 2,233,397, when a dog strains against a leash attached to a dog harness, it is important that the harness then avoid a choking effect on the throat of the dog or undue pressure on throat muscles, cords and nerves, for these may have adverse effects on the lungs and heart of the dog. While Bloom discloses a non-choking harness, this harness does not act to discourage the dog from straining against the leash. Indeed, because the harness is non-choking, there is nothing to inhibit such straining and to hold the dog in check.

The need exists, therefore, for a harness to break older dogs of the habit of straining at the leash and for training younger dogs not to strain at the leash. When a dog strains at the leash, it may, in doing so, wrest the leash from the hands of its master who then loses control of the dog. But this is perhaps a less objectionable aspect of straining, for in the case of a master of advanced years or in relatively weakened condition, should the master hold tightly onto the strained leash to maintain control of the dog, the master may then be pulled to the ground or otherwise upset, with possibly damaging consequences.

To prevent straining at the leash, hobble-type dog harnesses are known, such as the hobble harness disclosed in the Patience et al. U.S. Pat. No. 2,670,712, which normally permits free movement of the animal but which restricts the action of the forelegs when the dog attempts to run away or otherwise go out of control.

The Patience et al. harness includes a conventional dog collar and a shoulder strap that has hoops at its opposite ends that loosely fit over the forelegs of the dog. The shoulder strap is adjustable so that the foreleg hoops can be drawn up but not so tightly as to interfere with normal movement of the dog's forelegs. However, if the dog strains on the leash, this strain is also exerted on the shoulder strap, and the foreleg hoops are then drawn upwardly so that movement of the forelegs is restrained and the dog will be brought to a halt.

A harness of the Patience et al. type imposes a physical restraint on the forelegs, and its effectiveness depends on the strength of the dog. Thus with a small dog, this harness may be fully effective, but with a large and more powerful dog, the hareness may fail to restrain the dog, particularly if he succeeds in wresting the leash from the hands of his master.

In my prior U.S. Pat. No. 4,964,369 (Sporn), there is disclosed a dog harness to which a leash is attachable, the harness acting to inhibit the dog from straining against the leash without, however, producing a choking action. The harness comprises a collar that encircles the neck of the dog, and left and right restraint cables whose leading ends are connected to the front section of the collar at left and right positions thereon. The restraint cables go loosely under the left and right foreleg pits of the dog and through respective slip rings attached to the rear section of the collar, the trailing ends of the cables terminating in a coupler to which the leash is attached. When the harnessed dog strains at the leash, this acts to tighten the restraint cables which then impose a pressure on the foreleg pits. Because these pits are highly sensitive, the dog, in order to relieve this pressure, will then cease to strain against the leash and thereby again loosen the restraint cable.

While a harness of the type disclosed in my prior '369 patent is effective for its intended purpose, it requires a collar whose size is appropriate to the neck size of the dog on which it is installed. Also, this harness entails slip rings on the collar through which the restraint cables pass, the cables terminating in a common coupler to which the leash is attached. Since the cables are more or less tightened when the dog strains against the leash, the cables are in time abraded by the rings through which they pass.

In my above-identified application, there is disclosed a collarless dog harness composed of a pair of loops that depend from a leash-coupling junction to which the loops are joined, the loops being angled at the junction with respect to each other so that they cross over and interconnect at a crossover site. When the harness is installed on the dog, the coupling junction then overlies the dog's shoulder intermediate the right and left forelegs, and the crossover site then lies below the dog's chest, one loop runing from the site through the crotch between the chest and the left foreleg, and back to the junction, the other loop running from this site through the crotch between the chest and the right foreleg, and back to the junction.

As with the harness disclosed in my prior '369 patent, should the leash be strained, the loops would then ride up the crotches to engage and apply pressure to the sensitive pits of the forelegs to induce the dog to cease straining and thereby relax the discomfort-producing pressure. However, this harness has a distinct advantage over that disclosed in my prior patent, for it does not entail a dog collar.

The loops comprising the harness disclosed in my application are formed of straps of adjustable length, each strap being provided with a releasable buckle which must be unbuckled to install the harness on the dog. These buckles are placed just below the crossover site and press against the chest of the dog, producing some degree of discomfort. Another disadvantage of buckles is that they add significantly to the cost of manufacturing the dog harness.

SUMMARY OF INVENTION

In view of the foregoing, the main object of this invention is to provide an improved leash-controllable dog harness of relatively simple design adapted to apply pressure to the highly-sensitive pits of the dog's forelegs and thereby inhibit a dog wearing the harness from taking an action that is not acceptable to the holder of the leash.

Among the significant features of an improved leash-controllable dog harness in accordance with the invention are the following:

A. The harness includes no neck collar that must be fitted to the neck of the dog being harnessed, nor does the harness include releasable buckles that must be unbuckled to install the harness.

B. The harness does not physically restrain or hobble foreleg movement of the dog.

C. The effectiveness of the harness does not depend on the size and strength of the dog or on its breed, for it is effective on all dogs of all breeds.

More particularly, an object of the invention is to provide a harness of the above type which includes a pair of loops, one passing through the crotch between the chest of the dog and its right foreleg, the other through the crotch between the chest and the left foreleg, which loops, when the leash is strained, ride up the crotches to engage and apply pressure to the foreleg pits.

Among the important advantages of a harness in accordance with the invention is that the size of each loop is easily adjusted so that it is appropriate to the form and size of the dog wearing the harness, which harness is easily installed on the dog or removed therefrom.

Still another object of the invention is to provide a leash-controllable harness whose loops are formed of high-strength, flexible fabric webbing, so that the harness is comfortable to wear and may be mass produced at relatively low cost.

Yet another object of the invention is to provide sleeves for the straps of the harness which prevent the straps sliding through the sleeves from chafing the dog.

Briefly stated, these objects are attained in a leash-controllable dog harness adapted to inhibit a dog from straining against the leash held by an individual walking the dog, the harness inducing the dog to come to a halt or to walk at a pace acceptable to the leash holder. The harness is composed of a pair of loops and a shoulder junction having left and right openings, each loop being formed by a strap of adjustable length whose leading end is linked to the junction and whose trailing end slides through a respective opening and is coupled to the leash whereby when the leash is strained, both straps are then pulled.

The loops are angled with respect to each other to interconnect at a crossover site. When the harness is installed on a dog, the shoulder junction then overlies the dog's shoulder intermediate the right and left forelegs, and the crossover site lies under the dog's chest, one strap running from the site through the right foreleg crotch, the other strap running from the site through the left foreleg crotch. Should the harnessed dog strain against the leash, this causes both straps to ride up the respective crotches to impose pressure on the highly-sensitive foreleg pits, whereby the dog, in order to relieve the resultant discomfort, then relaxes the strain.

BRIEF DESCRIPTION OF DRAWINGS

For a better understanding of the invention as well as other objects and further features thereof, reference is made to the following detailed description to be read in conjunction with the accompanying drawings, wherein:

FIG. 1 shows a dog wearing a harness of the type disclosed in my patent application;

FIG. 2 illustrates, in perspective, an improved dog harness in accordance with the invention;

FIG. 3 shows the harness installed on a dog;

FIG. 4 illustrates how the trailing ends of the loop straps are fastened together so that they can be coupled to a leash;

FIG. 5 shows a protective sleeve for a harness strap;

FIG. 6 shows the sleeve mounted on a loop strap going through a foreleg crotch; and FIG. 7 is a section taken through the sleeve.

DESCRIPTION OF INVENTION

The Prior Harness

Since a dog harness in accordance with the invention is an improvement over a harness of the type disclosed in the above-identified application, in order to best appreciate the distinctions between these harnesses, we shall first describe the prior harness in connection with FIG. 1.

This harness includes a pair of loops 10 and 11 formed by straps which may be of fabric web or other material whose lengths are adjustable by means of tri-slides 12 and 13. The adjustment is made by sliding these slides along the loop straps. Also provided is a diamond-shaped shoulder junction 14 divided into two triangular openings by a diagonal bar 15. One end of loop 10 is coupled to the lower left arm of shoulder junction 14, and one end of loop 11 is coupled to the lower right arm of the shoulder junction.

The other end of loop 10 passes through the left opening in the shoulder junction and slides against the upper right arm of this junction. These ends terminate in a common harness coupling ring 16.

The metal snap connector 17 of a leash 18 is coupled to coupling ring 15; hence, when one pulls the leash, the ends of loops 10 and 11 slide over the upper arms of the junction to tighten the loops. Loop 10 is provided with a plastic side release buckle 19, and loop 11 with a side release buckle 20 so that the loops can be unbuckled from the dog to remove the harness.

To install the harness, the junction 14 is placed on the dog's shoulder midway between the dog's left and right forelegs. Loop 10 is buckled so that it passes through the crotch between chest CH and the left foreleg of the dog D. And loop 11 is buckled so that it passes through the crotch between chest CH and the right foreleg, the loops being angled with respect to each other and crossing over at a site 21 where they are stitched together.

The sizes of the loops are pre-adjusted so that when installed on the dog, the loops are somewhat loose and do not bind the dog at any point. But however adjusted in size, the loops cannot become disengaged from shoulder junction 14, for bar 15 on the junction prevents the ends of the loops coupled to common ring 16 from slipping out of the junction.

When, therefore, the harnessed dog is led by an individual holding leash 18 at an acceptable pace and the walking dog does not strain against the leash, the harness remains loose and comfortable, and the loops passing through the crotches are then disengaged from the sensitive pits of the dog's forelegs.

However, should the dog lurch ahead or seek to increase its pace so that it is moving faster than the individual walking the dog, the leash will then be strained. This strain will act to exert a pull on ring 16 which will draw the ends of loops 10 and 11 coupled thereto further out of junction 14 and in doing so tighten the loops passing through the crotches, thereby causing the loops to ride up the crotches to engage and press against the foreleg pits. The resultant discomfort will induce the dog to relax the strain on the leash so that the loops no longer press against the sensitive pits.

Improved Harness

As shown in FIGS. 2 and 3, an improved harness in accordance with the invention is composed of a pair of loops formed by straps 21 and 22 of fabric webbing or similar material, and a shoulder junction 23 having a generally triangular form. Junction 23 is provided with a T-shaped bar 24 whose horizontal component bridges opposing sides of the junction and whose vertical component is joined to the upper end of the junction. The bar defines left and right openings.

The leading end of strap 21 is linked to the lower right arm 23R of the junction and the leading end of strap 22 is coupled to the lower right arm 23R of the junction. The loops created by the straps are angled with respect to each other and are interconnected by a rivet at a crossover site 25 which when the harness is installed, then lies below the chest CH of the dog.

The length of the strap 21 between its leading end linked to arm 23C and crossover site 25 is adjustable by means of a tri-slide 26 and its length between this site and the trailing end 21T the strap is adjustable by means of a tri-slide 27. The length of strap 22 between its leading end linked to arm 23R and crossover site 25 is adjustable by means of a tri-slide 28 and is length between this site and the trailing end 22T of the strap is adjustable by means of tri-slide 29.

The trailing end 20T of strap 21 slides through the right opening in shoulder junction 23 and terminates in a grommet 30. The trailing end 22T of strap 22 slide through the left opening in shoulder junction 23 and terminates in a grommet 31.

As best seen in FIG. 4, secured to the inner surface of trailing end 21T of strap 21, just below the grommet 30, is one component $V_a$ of a VELCRO nylon hook and loop fastener, while secured to the inner surface of trailing end 22T of strap 22 just below grommet 31 is the other component $V_b$ of the fastener.

When the two components of the VELCRO fastener are fastened together the grommets 30 and 31 lie in registration with each other and the retractable coupling ring 16 of the snaps connector 17 may then be linked to the grommets.

Hence when the leash is pulled, the action exerts a pull on both straps to cause the loops formed by the straps to tighten and ride up the foreleg crotches of the dog to apply pressure to the highly-sensitive foreleg pits and in doing so induce the dog to relieve this pressure by relaxing the strain exertion on the leash.

Should the dog's master wish to give the dog his freedom by disconnecting the leash from the harness, this action will not cause the harness to come off the dog, for the trailing ends 21T and 22T of the straps are held together by the VELCRO fastener and therefore will not slip out of the shoulder junction 23, for the joined together trailing ends will be intercepted by the T-bar 24.

If one wishes to remove the harness from the dog, to do so, one has only to pull apart the trailing ends of the straps, so that they can slip out of the shoulder junction, the straps then being withdrawn from the foreleg crotches.

And to install the harness on the dog, one has only to place the shoulder junction on the shoulder of the dog and pass the straps under the crotches, and slide the trailing ends of the straps through the openings in the junction. The harness includes no buckles and there is no need therefore to buckle the straps to complete the loops.

Protective Sleeves

In the harness shown in FIG. 3, straps 21 and 22 which go through the left and right foreleg crotches, when they are tightened, they rub against the surface of the dog and with continued use the action may cause chafing or irritation.

To avoid such chafing without however interfering with the ability of the harness to control the dog on which it is installed, mounted on each strap is an elongated protective sleeve 32. This sleeve is shown in connection with strap 21 in FIGS. 5 to 7.

Sleeve 32 has a tubular inner liner 33 formed of woven or knitted nylon or similar smooth fabric material, on which is anchored a soft coat 34 of Sherpa or cashmere wool or other soft, non-abrading material.

Sleeve 32, when mounted on a strap, is so placed on the installed harness as to pass through the related foreleg of the dog. When the strap is tightened because the leash is strained, the sleeve does not shift axially, but the strap which is within the sleeve, slides along the surface of the smooth, low-friction inner liner, and as it is tighened, causes the sleeve to ride up the foreleg crotch to engage the foreleg pit to apply pressure thereto. But because the sleeve is soft and not shifted axially, no chafing takes place.

The inner liner 33 of the sleeve is preferably fabricated of stretchable material so that when mounting the sleeve on a strap, the sleeve whose diameter is somewhat smaller than the width of the tri-slide on the strap to adjust its length, will stretch to permit the slide to pass through the sleeve.

While there has been shown a preferred embodiment of an improved leash-controllable dog harness and protective sleeves therefor, it will be appreciated that many changes may be made thereon without departing from the spirit of the invention.

I claim:

1. A harness for a dog having right and left foreleg crotches leading to sensitive foreleg pits, and a leash coupled to the harness which extends to the rear of the dog to effect control of the dog; said harness comprising two straps which pass through the respective crotches and are coupled to the leash whereby when the leash is pulled, the straps then ride up the crotches to press against the foreleg pits to control the dog, each strap having mounted thereon a tubular sleeve of flexible material which extends through the related crotch and engages the related foreleg pit, the strap being slidable in the sleeve whose exterior is formed of soft material to prevent chafing of the dog by the sliding strap.

2. A harness as set forth in claim 1, in which the sleeve is formed of stretchable fabric material.

3. A harness as set forth in claim 1, in which the sleeve has an inner liner having a smooth surface to facilitate sliding of the strap therethrough.

4. A harness as set forth in claim 3, in which the sleeve has an outer surface formed of a material having the soft properties of wool.

5. A harness, as set forth in claim 1, in which the two straps are included in a pair of loops which are angled with respect to each other to interconnect at a crossover site intermediate the foreleg crotches.

6. A collarless harness for a dog having on either side of a shoulder, right and left forelegs whose crotches lead to sensitive foreleg pits, in combination with a leash coupled to the harness, said harness being adapted to inhibit the dog harnessed from straining against the leash, said harness comprising two straps extending from the shoulder of the dog and passing through the foreleg crotches to join said leash, said leash when strained by the dog causing the straps joined thereto to ride up the foreleg crotches to press against the foreleg pits and thereby induce the dog to cease straining against the leash.

* * * * *